United States Patent
Wentink et al.

(10) Patent No.: US 6,907,050 B1
(45) Date of Patent: Jun. 14, 2005

(54) METHOD AND DEVICE FOR CHARGING COMMUNICATIONS BASED ON RSVP PROTOCOL

(75) Inventors: Maarten Menzo Wentink, The Hague (NL); Michael Maria Visser, Gouda (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 09/555,685

(22) PCT Filed: Dec. 2, 1998

(86) PCT No.: PCT/EP98/07800

§ 371 (c)(1),
(2), (4) Date: Aug. 1, 2000

(87) PCT Pub. No.: WO99/30476

PCT Pub. Date: Jun. 17, 1999

(30) Foreign Application Priority Data

Dec. 5, 1997 (NL) ............................................. 1007702

(51) Int. Cl.[7] .................................................. H04J 1/02
(52) U.S. Cl. .................... 370/493; 370/389; 379/114.22
(58) Field of Search ................................. 370/260, 261, 370/389, 493, 494, 495; 379/114.06, 114.22, 127.05, 114.07, 14.21, 114.24, 114.25

(56) References Cited

U.S. PATENT DOCUMENTS

| 5,623,405 A | | 4/1997 | Isono | |
|---|---|---|---|---|
| 6,175,619 B1 | * | 1/2001 | DeSimone | 379/202.01 |
| 6,366,577 B1 | * | 4/2002 | Donovan | 370/352 |
| 6,487,170 B1 | * | 11/2002 | Chen et al. | 370/231 |
| 6,636,504 B1 | * | 10/2003 | Albers et al. | 370/352 |
| 6,678,729 B1 | * | 1/2004 | Ahoor et al. | 709/224 |
| 6,707,799 B1 | * | 3/2004 | Chui | 370/282 |

FOREIGN PATENT DOCUMENTS

| WO | WO 97/13352 | 4/1997 |
|---|---|---|
| WO | WO 97/33404 | 9/1997 |
| WO | WO 97/37462 | 10/1997 |

OTHER PUBLICATIONS

E. Roberts; RSVP: A Priority Problem?; May 1997; pp. 60–64; Data Communications.
R. Edell et al; Billing Users and Pricing For TCP; Sep. 1995; pp. 1162–1175; IEEE Journal on Selected Areas in Communications.
M. Karsten et al; An Embedded Charging Approach For RSVP; May 1998, pp. 91–100; IEEE.
H. Yang et al; Application of MAS in Implementing Rational IP Routers on the Priced Internet; Aug. 1996; pp. 166–180.

* cited by examiner

*Primary Examiner*—Duc Ho
*Assistant Examiner*—Thien Tran
(74) *Attorney, Agent, or Firm*—Frishauf, Holtz, Goodman & Chick, P.C.

(57) ABSTRACT

The present invention describes a protocol with which it is possible to establish a connection suitable for voice communication in a network such as internet. In a first step, a PATH message is transmitted from an initiator (1) to a called station (2). In a second step, an RESV message is transmitted from the called station (2) back to the initiator (1), along the same route (23) followed by the PATH message. If either the initiator (1), or the called station (2), or both, contain information in the PATH message and/or the RESV message that indicates payment willingness, each router (22) along the route (23) will reserve a part of its capacity for a direct connection.

22 Claims, 3 Drawing Sheets

Figure 1:
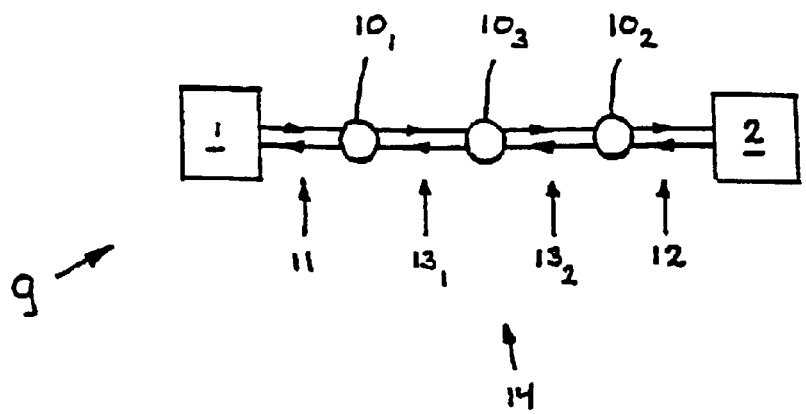

| | PATH | RESV | decision by route |
|---|---|---|---|
| A | 1 | 0 | yes |
| B | 0 | 1 | yes |
| C | 0 | 0 | no |
| D | 1 | 1 | yes |

|   | PATH | RESV | decision by route |
|---|---|---|---|
| A | 1 | 0 | yes |
| B | 0 | 1 | yes |
| C | 0 | 0 | no |
| D | 1 | 1 | yes |

FIG. 4

METHOD AND DEVICE FOR CHARGING COMMUNICATIONS BASED ON RSVP PROTOCOL

The present invention is related to a method and device for communication, in particular two-way communication, more in particular voice communication.

Although the present invention is in particular applicable to two-way voice communication between two persons, and the present invention will be specifically explained below for this application, it is emphasised that the present invention is not restricted to this application.

Two-way voice communication is generally known nowadays in the form of telephone traffic. Two mutually communicating parties make use of a telephone network in that regard, said network being managed by at least one network administrator. The provision of a communication channel between both parties is a service which is offered by the network administrator, and which must be paid for by at least one of both parties. It is usually the calling party, that is, the party upon whose initiative the connection is established and who will be referred to below with the term "initiator", who pays for the connection, the amount of the payment inter alia being dependent upon the distance between both parties and the length of the call, that is, the time during which the connection was maintained.

In the past years the use of personal computers has expanded enormously, and likewise the so-called "internet" has developed into a world-wide network of communication connections between the computers connected thereto. Via said network, computers can exchange data and/or communicate with each other. The information to be transmitted by a computer is guided, via various intermediate stations, to an addressed computer, or to an electronic mailbox from which the addressed computer can retrieve the information at a suitable time. The time duration for the transfer of the information, and the route along which this occurs, is not specified in this regard. In principal it is so, that different parts of the message to be sent can reach their final destination via different routes, and not necessarily in the original order.

Such a manner of communication is, of course, not suitable for real-time voice communication. The various parts of a spoken message must, in relation to each other, arrive at their destination without too great a time delay and in the correct order.

A need exists to use the internet (or similar networks) for voice communication. This implies that a real "connection" must be established between two stations and that provisions must be made to ensure that the various parts of the (digitised) message arrive at their destination within a fixed time, for example 100 ms. To this end a protocol is currently under development, called "Resource Reservation Protocol" (RSVP). By means of this protocol, certain nodes or intermediate stations of the network, referred to below as "routers", are, stating it briefly, instructed to maintain a certain connection: a certain amount of processing capacity of the related routers is, as it were, "reserved".

Although the currently known protocol in itself is quite satisfactory for establishing a connection, it has the disadvantage of not providing facilities for having at least one of the users pay for the established reservation. It is not only particularly useful, from an economic point of view, for the various administrators of the various routers to be able to have at least one of the users pay for the provision of the said service (reservation), but this also has the advantage that the users will only request and maintain the reservation for the duration of the call. If the reservation were "free", it would not be inconceivable that a user continues a given reservation even if it is not used, thus unnecessarily burdening the capacity of the network. If the users have to pay for the reservation, they will sooner tend to cancel the reservation when it is no longer required, so that in fact the capacity of the network for establishing voice communication can be used as efficiently as possible.

A problem which plays a role in this regard is the question who must pay for the connection. In principal this will be the initiator of the connection, but, in an internet or similar network, where a connection is established on the basis of the currently known RSVP protocol, it is not known, in contrast to telephone networks, who the initiator is, as will be discussed in more detail below.

The present invention seeks to provide a solution for this problem. it is observed that accounting systems as such for networks are already known e.g. from WO97/37462. This International patent application teaches a communication network, which comprises a communication monitoring point arranged to monitor user identifiers in packets to determine a charging scheme which includes charge allocation.

More in particular, the present invention seeks to provide a protocol which makes it possible that, upon the establishment of the connection, the initiator of the connection can be identified, or that at any rate it can be identified which of the two parties is willing to pay for the connection.

Yet more in particular, the present invention seeks to make the RSVP protocol suitable for the above-mentioned purpose by providing as few changes as possible.

Figure 2:
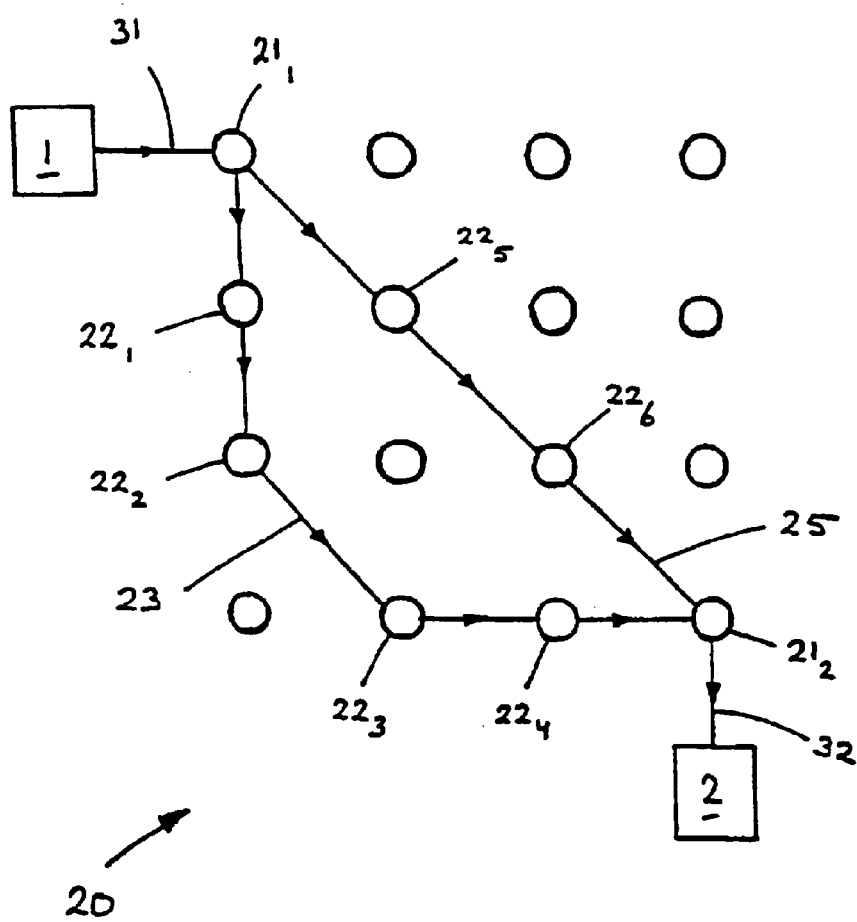
Figure 3:
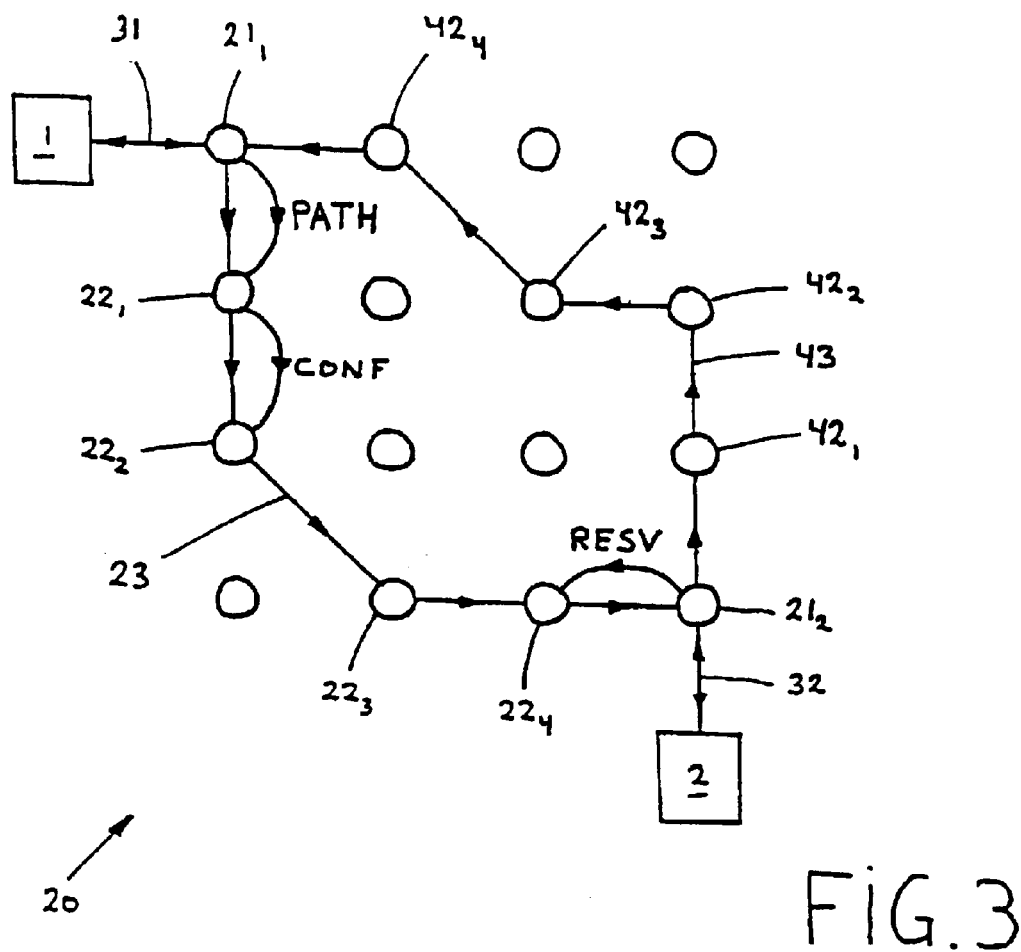
Figure 5:
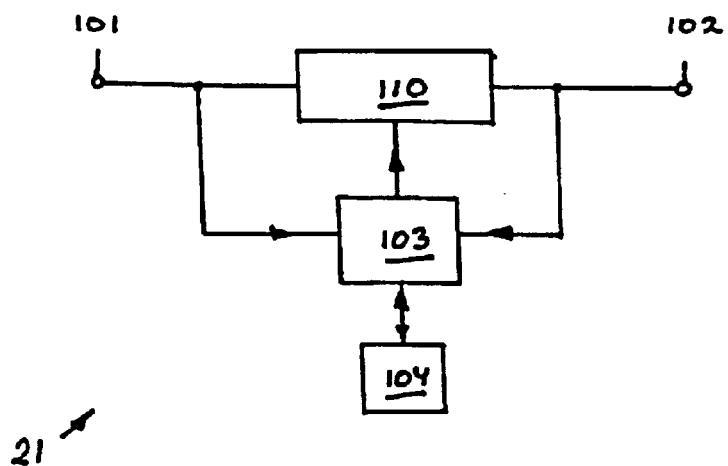

The above-mentioned aspects, characteristics and advantages of the present invention will be further explained by the following description of an embodiment of the protocol according to the present invention, with reference to the drawing, in which:

FIG. 1 diagrammatically illustrates a telephone network;

FIG. 2 diagrammatically illustrates internet communication;

FIG. 3 diagrammatically illustrates the establishment of a voice connection via the internet;

FIG. 4 shows a decision table; and FIG. 5 illustrates a router.

With reference to FIG. 1, a telephone connection will now be discussed. FIG. 1 diagrammatically shows a telephone network 9, comprising a number of intermediate stations (switches) 10, as well as a plurality of subscribers, of which only two are shown in FIG. 1, designated by the reference numbers 1 and 2. FIG. 1 shows a situation in which a voice connection, which in general is designated by the reference number 14, is present between the subscribers 1 and 2. The first subscriber 1 is coupled to a first switch $10_1$ via a first duplex connection 11. The second subscriber 2 is coupled to a second switch $10_2$ via a second duplex connection 12. The two switches $10_1$ and $10_2$ can be coupled to each other directly or by intermediation by one or several switches $10_3$ by means of duplex connections 13; in FIG. 1, one such intermediate switch $10_3$ is shown, the switches $10_1$ and $10_2$ being coupled to said intermediate switch $10_3$ via duplex connections $13_1$ and $13_2$ respectively. It can also occur, however, that the two subscribers 1 and 2 are coupled to each other via only one single switch.

Since the construction of a telephone network and the operation of the switches 10 are not the subject of the present invention, and in addition to that are known per se, this will not be further explained. Relevant in regard to the present invention is the manner in which the voice connection between the subscribers 1 and 2 is established, which will now be explained under the assumption that the first subscriber 1 is the initiator and that the second subscriber 2 is the called party. First the duplex connection 11 is established between the initiator 1 and the first switch $10_1$, the initiator 1 informing the switch $10_1$ of the identity (telephone number) of the subscriber 2 with whom he wishes to communicate. Upon the establishment of said duplex connection 11, the first switch $10_1$ "knows" that the contact-seeking subscriber 1 is the initiator, and that the connection must be charged to him. Subsequently, the duplex connection $13_1$ between the first switch $10_1$ and the intermediate switch $10_3$ is established, after which the duplex connection $13_2$ between the intermediate switch $10_3$ and the second switch $10_2$ is established. It is always known in that regard that said connection is established at the request of the initiator 1. Finally, the duplex connection 12 between the second switch $10_2$ and the called subscriber 2 is established, making the total connection 14 a fact.

It is important in this regard that each of the said connections between the switches 10 mutually, and between the subscribers 1, 2 and the switches 10, is a duplex connection, and that, at the time a given (partial) connection is established, it is known who the initiator is of said (partial) connection.

It should be observed that, with a telephone connection, a direct communication connection 14 is established between two subscribers, said direct connection being maintained during the course of the call, which can be regarded as capacity reservation. The number and the identity of the intermediate stations $10_3$ to be connected do not need to be determined beforehand, but are maintained during the course of the call. It is further observed that this direct connection does not need to be established through a wire connection; wireless telephony or satellite telephony are also instances of a direct connection.

Conventional data transfer via the internet will now be discussed with reference to FIG. 2. The internet is illustrated in FIG. 2, as in the following figures, as a network 20 of separate switching stations 21, 22, said switching stations also being designated by "router". Each router 21, 22 can communicate with one or more other routers in the network 20. The network comprises several subscribers, of which in FIG. 2 again only two are represented. These subscribers 1, 2 are connected via a connection 31, 32 to a predetermined one of the said routers, respectively designated by the reference numbers $21_1$ and $21_2$. When one subscriber 1 wishes to transmit data to the other subscriber 2, he divides said (digitised) data into several small packages, and tries to transmit said small packages one by one. In doing so, the transmitting subscriber 1 will first transmit a first small package, together with the internet address of the addressed subscriber 2, to the router $21_1$ associated with said transmitting subscriber 1. Said router $21_1$ will transfer said message to one of the other routers, for example to the router designated in FIG. 2 by the reference number $22_1$. Said router $22_1$ would in turn transfer the message (i.e. small package plus internet address) to yet another router, for example the router designated in FIG. 2 by the reference number $22_2$. Ultimately, said small package can reach the addressed subscriber 2 via the following routers $22_3$, $22_4$ and $21_2$, said small package thus following a path designated by the reference number 23.

It should be observed that, in the conventional data transfer via the network 20 discussed above, no direct connection is established between the subscribers 1 and 2.

A second small package which is sent to the addressed subscriber 2 by the transmitting subscriber 1, does not necessarily need to follow the same route. In FIG. 2, another route 25 is shown, running via the routers $22_5$ and $22_6$. It will be clear that although all the small packages sent will indeed ultimately arrive at the addressed subscriber 2, the order in which said small packages arrive does not necessarily need to correspond with the order in which said small packages were sent by the transmitting subscriber 1. It should further be clear that the transmission by a router (for example $22_1$) of a small data package to a following router (for example $22_2$) can only occur when the first-named router $22_1$ is ready for transmission, and that it is not apparent beforehand at which point in time that will occur. This implies that it is not known beforehand how long the transmission from the sender I to the receiver 2 takes, and that the said periods of time can vary strongly for the various small data packages mutually.

As observed before, the manner of communication via internet illustrated in FIG. 2 is not suitable for establishing a real-time voice connection.

A known protocol which is suitable for establishing a real-time voice connection via internet will now be illustrated with reference to FIG. 3. In FIG. 3, reference numbers which are the same as in the FIGS. 1 and 2 designate the same or similar parts.

It is again assumed that the first subscriber 1 wishes to establish a connection with the second subscriber 2, and indeed a connection of which the quality is suitable for the transfer of speech. Below, said first subscriber 1 will also be designated by the term "initiator", and the second subscriber 2 will also be designated by the term "called party". For the sake of convenience, it is further assumed that said voice connection follows the route 23 referred to above. The requirement that the connection 23 must have a quality suitable for speech, implies that all the intermediate stations or routers $21_1$, $22_1$ to $22_4$ (inclusive), $21_2$, which are located along said route 23, must maintain the connection with a predecessor and a successor, or, in other words, must reserve part of their capacity for this connection. This is designated as "Resource Reservation", and a protocol developed to this end is designated as "Resource Reservation Protocol" (RSVP). This known protocol was developed primarily for establishing a connection with a predetermined quality between two stations 1 and 2, in which the second station 2 is a source of information and the first station 1 wishes to receive information from said source 2.

Since said protocol is already known by those skilled in the art, an extensive description of this is not necessary.

The building up of the voice connection according to said RSVP protocol takes place in various set up stages, and is preceded by a contact-seeking stage outside RSVP. At the very first, the initiator 1 transmits an initiation message ALERT over the network 20 to the called station 2. This is an "ordinary" message, transmitted in the manner described with reference to FIG. 2, to inform the called station 2 of the fact that the initiator 1 is seeking contact. On the basis of this message, a signal can be generated at the called station 2, such as for example a telephone ringing signal.

The called station 2 subsequently transmits, in a similar manner, a message CALL ACCEPT, indicating that the call is answered. Hereafter, the quality connection can be built up on the basis of the RSVP protocol.

In a first set up stage, the initiator 1 transmits a first message, designated by the term PATH, possibly accompanied by a first data package, to the called station 2, each router along the route 23 passing said message along to the following router. FIG. 3 shows that the router $21_1$, associated with the first station 1, passes the PATH message on to the next router $22_1$. In a similar manner, the routers $22_2, 22_3, 22_4$ and $21_2$ receive the PATH message from their predecessor, but for the sake of simplicity that is not shown in FIG. 3. The PATH message can be regarded as a command to the network 20 for establishing an arbitrary route 23 between the subscribers 1 and 2. At the moment that the PATH message reaches the second station 2, there is a set of routers $21_1, 22_1$ to $22_4$ (inclusive), and $21_2$ which "know" each other via the PATH message.

In a second set up stage, the second station 2 transmits a reservation command to all the routers $21_1, 22_1$ to $22_4$ (inclusive), $21_2$ along the route 23, said route 23, as mentioned above, being defined by the PATH messages left behind as a track by said routers. Said reservation command is, in a similar manner as described above in relation to the PATH message, passed on by each router along the route 23 to its predecessor. In FIG. 3, the transmission of the reservation command from the router $21_2$ associated with the second station 2 to the preceding router $22_4$ is illustrated and designated by the term RESV. The RESV message can be considered as a command to the network 20 to reserve the established route 23 for further use. In a similar manner as discussed above in relation to the PATH message, the transmission of the RESV message for the other parts of the route 23 is not represented for the sake of clarity.

It is observed that each router only passes the RESV message to a preceding router along said route 23 if the reservation requested by the second station 2 is indeed assigned by the related router. If the RESV message arrives at the first station 1, the first station 1 knows that all the routers along the route 23 have reserved a suitable portion of their capacity in the desired manner, and the first station 1 transmits a confirmation message CONF along the same route 23 to the second station 2. This confirmation message CONF is also passed along the route 23 by all routers to the next router; for the sake of clarity, this passing is illustrated in FIG. 3 only for the routers $22_1$ and $22_2$.

When said CONF message arrives at the second station 2, the second station 2 also knows that the desired route is reserved. It should otherwise be clear that the CONF message is not essential for the establishment of the requested reservation.

In fact, a real connection has now been established between the first station 1 and the second station 2, data communication and even voice communication being possible via said route 23. A complication in this regard is that said route 23 is a simplex connection, that is, said route 23 is only suitable for transmission of data from the first station 1 to the second station 2 (in relation to this simplex connection, the first station 1 can also be designated as sender and the second station 2 can also be designated as receiver). For voice communication in two directions, this is, of course, insufficient, and a second simplex route 43 must be established between the two stations 1 and 2, second simplex route 43 being suitable for voice communication from the second station 2 (sender) to the first station 1 (receiver). An example of such a second simplex route 43 is also shown in FIG. 3. This route is set up in a similar manner as said route 23, be it that the PATH messages are transmitted from the second station 2, that the RESV messages are transmitted from the first station 1, and that the CONF messages are transmitted from the second station 2, all thus being opposite to the setting up of the first-named route 23.

The said RSVP protocol works satisfactorily, be it that the protocol is indeed suitable for setting up a double simplex quality connection between the two stations 1 and 2. In this known protocol, no means have been provided to have the stations 1 and/or 2 pay for the requested reservation. If the requested reservation is free of charge, there is no reason for the stations 1 and 2 to cancel the assigned reservation when it is no longer needed, so that said reservation can be maintained longer than necessary, which implies an inefficient use of the capacity of said network 20. It is an objective of the present invention to increase the efficiency of the use of said network 20 by stimulating the users of said network 20 to cancel an assigned reservation as soon as possible.

A complication in this regard is that those costs must be charged to one of the mutually communicating stations 1 and 2, but that no information is available on the routers with respect to the question which of said stations 1, 2 is to receive the bill. In first instance, it would seem logical to charge the costs to the initiator of the voice connection 23, 43, said initiator being the first station 1 in the example sketched, but the routers along the two routes 23, 43 do not "know" which of the two stations 1 and 2 is the initiator. The routers along the first route 23 receive a PATH message originating from the first station 1 (the initiator in its capacity as sender), while the routers along the second route 43 receive a PATH message originating from the second station 2 (the called party in the capacity of sender). Since the routers do not know whether they belong to a "first" route 23 or a "second" route 43, they therefore cannot draw a conclusion from the origin of the PATH message regarding the identity of the initiator. The same applies, mutatis mutandis, for the RESV messages and the CONF messages. The present invention seeks to provide a solution for this problem.

According to an important aspect of the present invention, a code is added in at least one of the said messages PATH, RESV, CONF which is indicative of the degree in which the sender of said message is willing to bear the costs of the reservation.

According to a further important aspect of the present invention, the routers are set up to take said information into account upon taking a decision with respect to the assignment of the requested reservation. More in particular, each router is set up to assign the requested reservation only in the event that for at least one of the two call partners willingness has been expressed to bear the costs.

The above-mentioned aspects of the present invention will now be further explained with reference to the FIGS. 3 and 4. On setting up the voice connection, the known RSVP protocol, which will not be further explained here since it is known per se, can be used in the manner discussed above with reference to FIG. 3. The precise form and content of the PATH, RESV, and CONF messages, too, are not relevant for a proper understanding of the present invention, and likewise will therefore not be discussed. It will suffice to remark that said messages can be identical to the known messages, except that at least one information location has been added thereto. In a simple embodiment, said additional information location has a length of only one bit. Said additional bit will be designated below by the term initiator bit. The value of said bit in the message indicates whether the sender of said message is or is not willing to bear the costs of the call. In the example to be discussed below, it is assumed that the value "1" of the initiator bit indicates payment willingness, and that the value "0" of the initiator bit indicates that the sender is not willing to bear the costs, but it will be clear that this can be reversed if desired.

It will now again be assumed that the first station 1 is the initiator of the voice connection to be set up between the two stations 1 and 2, and that said first station 1, as initiator, is prepared, as usual, to bear the costs of the call. This means that the initiator bit, in the PATH message to be transmitted by the first station 1, has the value of "1". After the route 23 has been established, all routers $21_1$, $22_1$ to $22_4$ (inclusive), $21_2$ along said route 23 have in their memory a PATH message of which the initiator bit has value "1". Hereafter, the second station 2, as discussed before, transmits an RESV message along the route 23. Since the second station 2 is the called station, that is, is not the initiator of the voice connection to be set up, the second station 2 sets the value of the initiator bit in the RESV message to "0".

The router $21_2$ related to the second station 2 receives this reservation request, and must now take a decision regarding the reservation to be assigned. The router $21_2$ thereto bases itself respectively on the two initiator bits of the PATH message in its memory and the RESV message it just received from the second station 2. Since the initiator bit of the PATH message has the value of "1", the requested reservation can be assigned. This is designated in FIG. 4 by A. In a similar manner, the other routers along the route 23 take the same decision as the router $21_2$, so that the requested reservation is established along the whole route 23. Thereafter, as described before, the CONF message is transmitted by the first station 1 to the second station 2.

For the setting up of the other route 43, the second station 2 transmits a PATH message, which is passed along the route 43 by the routers $21_2$, $42_1$ to $42_4$ (inclusive), $21_1$. Since the second station 2 is the sender with respect to the route 43 to be established and as such takes the initiative for setting up this route, but is not the initiator of the voice connection to be set up in general, the second station 2 sets the initiator bit in this PATH message to the value "0".

Subsequently, the first station 1 transmits an RESV message to the next station $21_1$ along the route 43. Since the first station 1 is the initiator of the voice connection to be set up in general between the stations 1 and 2, said first station 1 sets the initiator bit in the RESV message to the value "1". Said router 211 must now take a decision regarding the reservation to be assigned on the basis of the PATH message present in its memory and the RESV message received from said first station 1. Although the value of the initiator bit in the PATH message stored in its memory is indeed equal to "0", the value of the initiator bit in the RESV message received from the first station 1 is equal to "1", so that the requested reservation can be assigned. This is illustrated in FIG. 4 by B.

The example discussed above shows that, under normal circumstances, the value of the initiator bit to be transmitted is associated with the two-way voice connection being initiator or not. This does not always have to be the case, however, as will be explained below.

In normal telephone traffic, the concept "collect call" is known, that is, a call is requested by an initiator while the called party is asked whether he is willing to bear the costs of the call. In principal, this is also possible in the protocol suggested by the present invention, namely by setting the value of the initiator bits in a suitable manner. The value of the initiator bits, then, is not as much related to being initiator of the requested voice connection or not, as to the willingness to pay for the requested reservation. In other words, the initiator bit can also be designated by the term payment willingness bit.

On setting up a "collect call" voice connection from the first station 1, the PATH messages of the first station 1 will have an initiator bit of which the value is "0". If said called station 2 is indeed willing to bear the costs of the requested reservation, the RESV messages to be transmitted by said second station 2 will have an initiator bit or payment willingness bit of which the value is "1". It will be clear for those skilled in the art that the requested reservation along said route 23 is established on the basis of the conditions indicated in FIG. 4 by B, and that the requested reservation along the other route 43 is established on the basis of the condition shown by A.

If said second station 2, however, is not willing to bear the costs of the requested reservation of the voice connection initiated by said station 1, said second station 2 answers with an RESV message of which the initiator bit has the value of "0". The router $21_2$ will now not assign the requested reservation, since the value of the initiator bits of the PATH message stored in its memory and of the RESV message received from the second station 2 are both equal to "0", which is designated in FIG. 4 by C.

In that case, said router $21_2$ will also not pass the RESV message further to the preceding router $22_4$. The router $21_2$ can, instead of that, return an error message to the second station 2 indicating that the requested capacity reservation was not established, simultaneously also providing a reason for the same.

It is, of course, not inconceivable that both stations 1 and 2 are willing to pay for the requested reservation. In that case, the initiator bits of both PATH and RESV messages will have the value of "1". The routers then too will assign the requested reservation, as illustrated in FIG. 4 by D.

FIG. 5 illustrates a number of details of the construction of a router, which in FIG. 5 are designated in general by the reference number 21. The router 21 comprises two communication connections 101 and 102, with which said router 21 in said network 20 can be coupled with other routers. Said router 21 is provided with the means designated by reference number 110 in general for establishing a connection suitable for speech between the communication connections 101 and 102, said means being controlled by a control unit 103. The control unit 103 is coupled to said communication connections 101 and 102 in order to receive messages, such as said PATH, RESV and CONF messages, arriving at the said connections. Associated with the control unit 103 is a memory 104, in which the control unit 103 can store data.

If at one of said communication connections a PATH message is received by the control unit 103, said control unit 103 will analyse said PATH message with respect to the payment willingness information present therein, and will store in said memory 104 data which represents said payment willingness information. Said control unit 103 subsequently transmits said PATH message via another communication connection through to a following router.

If an RESV message is received at the said other communication connection, the control unit 103 analyses said RESV message with respect to the payment willingness information present therein. The control unit 103 further consults said memory 104 with respect to the said previously stored data. If at least one of said data from said memory 104 and the payment willingness information in the RESV message indicates payment willingness, said control unit 103 controls the said means 110 such that at least a part of the capacity of the means 110 is reserved for a direct connection between said communication connections 101 and 102, and said control unit 103 will transmit the RESV message, via the former communication connection through to the router from which initially the named PATH message was received.

In the above, it was explained how the requested reservation of a certain route between two stations can be assigned or rejected on the basis of the apparent payment willingness of at least one of said stations. A following aspect is the actual on-charging of costs for the established reservation, where said costs will be dependent upon various factors. The manner in which said costs are calculated and charged to one of said stations 1, 2, is not the subject of the present invention and will therefore not be further explained here. It will suffice to remark that the PATH message not only contains information regarding the identity of the addressee, but also regarding the identity of the sender of said PATH message; the same applies for the RESV message. This implies that, in principal, each router which is involved with said routes 23 and 43 is able, on the basis of the information in the PATH and RESV messages, and on the basis of a rate to be determined by the router itself, to determine on the one hand what the costs are of the established reservation, and to determine on the other hand to whom said costs must be charged. Thus, in principal, each router along said routes 23 and 43 could send an invoice to said initiator 1, or, in the case of "collect call", to said called party 2.

In this regard it is further observed that, in the case designated in FIG. 4 by D, where both call partners 1, 2 are willing to pay for the established reservation, the routers along said routes 23 and 43 can choose to charge the costs of the established reservation to the sender of the PATH message, the sender of the RESV message, or to both at half rate.

It will be clear for a person skilled in the art that the present invention is not restricted to the examples discussed above, and that various variations and modifications in the examples discussed are possible without departing from the scope of the invention as defined in the appended claims.

Thus it is possible, for example, that the information in the payment willingness field indicates a part of the costs which the sender is willing to pay, for example expressed in a percentage of the costs or as an absolute amount. In that case, a router will only assign the requested reservation if the willingness of both call partners together corresponds to at least 100% of the reservation costs.

It is observed that the present invention is discussed above for the world-wide internet, but that the present invention is also applicable to communication via other networks, for example local, regional or national networks. The invention is, in fact, applicable to each IP-network in which minimally simplex connections are possible.

It is further observed that "reservation" does not mean that a router is fully occupied. It is therefore very well possible that said routes 23 and 43 have one or more routers in common, or are even identical.

What is claimed is:

1. Method for establishing a connection suitable for communication in at least one direction between two subscriber stations in a communication network comprising a plurality of switching stations or routers, in which a first subscriber station and a second subscriber station are connected with a predetermined router, and in which each router can communicate with at least some of the other routers in the network;

in which said connection runs via at least one of the said routers, each router being connected to a corresponding previous station or router and a corresponding next station or router;

in which the first station transmits a first message to the second station via a first route comprising at least one router, said first message containing first payment willingness information;

in which the second station, in response to the reception of the first message, transmits a second message back to the first station via the said first route, the said second message containing second payment willingness information;

in which a router receiving the second message, if at least one of the first and the second payment willingness information entities has a predetermined value which is indicative of payment willingness, reserves at least a part of its communication capacity for direct connection with previous and following stations and routers related to said router.

2. Method according to claim 1, in which a router receiving the second message, if at least one of the first and the second payment willingness information entities has a predetermined value indicative of payment willingness, also transmits the second message to the previous router or station related to said router, which is repeated until said second message arrives at the first station.

3. Method according to claim 2, in which the first station, in response to the reception of the second message, transmits a third message to the second station via the said route.

4. Method according to claim 3, in which the said first subscriber station is the initiator of the connection to be established and the said second subscriber station is the called station, in which the first payment willingness information has a predetermined first value which is indicative of payment willingness and in which the second payment willingness information has a second value which is different from said predetermined first value.

5. Method according to claim 3, in which said first subscriber station is initiator of the connection to be established and the said second subscriber station is the called station, and in which, in the case of "collect call", the second payment willingness information has a predetermined first value which is indicative of payment willingness and the first payment willingness information has a second value which is different from said predetermined first value.

6. Method according to claim 3, in which the said second subscriber station is the initiator of the connection to be established and the said first station is the called station, in which the second payment willingness information has a predetermined first value which is indicative of payment willingness and the first payment willingness information has a second value which is different from the said predetermined first value.

7. Method according to claim 3, in which the said second subscriber station is the initiator for the connection to be established and the said first subscriber station is the called station, in which, in the case of "collect call", the first payment willingness information has a predetermined first value which is indicative of payment willingness and the second payment willingness information has a second value which is different from said predetermined first value.

8. Method according to claim 2, in which the said first subscriber station is the initiator of the connection to be established and the said second subscriber station is the called station, in which the first payment willingness information has a predetermined first value which is indicative of payment willingness and in which the second payment willingness information has a second value which is different from said predetermined first value.

9. Method according to claim 2, in which said first subscriber station is initiator of the connection to be established and the said second subscriber station is the called station, and in which, in the case of "collect call", the second payment willingness information has a predetermined first value which is indicative of payment willingness and the first payment willingness information has a second value which is different from said predetermined first value.

10. Method according to claim 2, in which the said second subscriber station is the initiator of the connection to be established and the said first station is the called station, in which the second payment willingness information has a predetermined first value which is indicative of payment willingness and the first payment willingness information has a second value which is different from the said predetermined first value.

11. Method according to claim 2, in which the said second subscriber station is the initiator for the connection to be established and the said first subscriber station is the called station, in which, in the case of "collect call", the first payment willingness information has a predetermined first value which is indicative of payment willingness and the second payment willingness information has a second value which is different from said predetermined first value.

12. Method according to claim 1, in which the first station in response to the reception of the second message, transmits a third message to the second station via the said route.

13. Method according to claim 12, in which the said first subscriber station is the initiator of the connection to be established and the said second subscriber station is the called station, in which the first payment willingness information has a predetermined first value which is indicative of payment willingness and in which the second payment willingness information has a second value which is different from said predetermined first value.

14. Method according to claim 12, in which said first subscriber station is initiator of the connection to be established and the said second subscriber station is the called station, and in which, in the case of "collect call", the second payment willingness information has a predetermined first value which is indicative of payment willingness and the first payment willingness information has a second value which is different from the said predetermined first value.

15. Method according to claim 12, in which the said second subscriber station is the initiator of the connection to be established and the said first station is the called station, in which the second payment willingness information has a predetermined first value which is indicative of payment willingness and the first payment willingness information has a second value which is different from the said predetermined first value.

16. Method according to claim 12, in which the said second subscriber station is the initiator for the connection to be established and the said first subscriber station is the called station, in which, in the case of "collect call", the first payment willingness information has a predetermined first value which is indicative of payment willingness and the second payment willingness information has a second value which is different from said predetermined first value.

17. Method according to claim 1, in which the said first subscriber station is the initiator of the connection to be established and the said second subscriber station is the called station, in which the first payment willingness information has a predetermined first value which is indicative of payment willingness and in which the second payment willingness information has a second value which is different from said predetermined first value.

18. Method according to claim 1, in which the first subscriber station is initiator of the connection to be established and the second subscriber station is the called station, and in which, in the case of "collect call," the second payment willingness information has a predetermined first value which is indicative of payment willingness and the first payment willingness information has a second value which is different from said predetermined first value.

19. Method according to claim 1, in which the said second subscriber station is the initiator of the connection to be established and the said first station is the called station, in which the second payment willingness information has a predetermined first value which is indicative of payment willingness and the first payment willingness information has a second value which is different from the said predetermined first value.

20. Method according to claim 1, in which the said second subscriber station is the initiator for the connection to be established and the said first subscriber station is the called station, in which, in the case of "collect call", the first payment willingness information has a predetermined first value which is indicative of payment willingness and the second payment willingness information has a second value which is different from said predetermined first value.

21. Router, suitable for inclusion in a network, comprising:
    at least two communication connections;
    means for establishing a connection between said communication connections;
    a control unit, coupled to the said communication connections, which is arranged for controlling said means;
    a memory coupled to the control unit;
    in which the control unit, in response to the reception of a first message at one of said communication connections, is arranged for storing in the said memory data which is representative of the payment willingness information present in said first message, and for transmitting the first message to a following router via another communication connection;
    in which the control unit, in response to the reception of a second message at the said other communication connection, is arranged, if at least one of the data stored in the said memory and the payment willingness information present in the received second message has a value which is indicative of payment willingness, for reserving at least a part of the capacity of the means for a direct connection between said communication connections and.

22. Router according to claim 21, in which the control unit, in response to the reception of the second message at the said other communication connection, is arranged, if at least one of the data stored in the said memory and the payment willingness information present in the received second message has a value which is indicative of payment willingness, for transmitting the second message via the communication connection to the router preceding said router.

* * * * *